United States Patent
Chen et al.

(10) Patent No.: US 8,233,273 B2
(45) Date of Patent: Jul. 31, 2012

(54) ELECTRONIC DEVICE

(75) Inventors: Ming-Chih Chen, Taipei Hsien (TW);
Yung-Li Jang, Taipei Hsien (TW);
Hsien-Yung Wang, Taipei Hsien (TW);
Wen-Chun Tsao, Taipei Hsien (TW)

(73) Assignee: Wistron Corp., New Taipei (TW)

( * ) Notice: Subject to any disclaimer, the term of this patent is extended or adjusted under 35 U.S.C. 154(b) by 195 days.

(21) Appl. No.: 12/580,978

(22) Filed: Oct. 16, 2009

(65) Prior Publication Data

US 2010/0259889 A1 Oct. 14, 2010

(30) Foreign Application Priority Data

Apr. 8, 2009 (TW) .............................. 98111629 A

(51) Int. Cl.
*H05K 7/20* (2006.01)

(52) U.S. Cl. .................. 361/679.46; 361/688; 62/259.2; 340/540

(58) Field of Classification Search ........ 361/679.46–679.55, 688–699
See application file for complete search history.

(56) References Cited

U.S. PATENT DOCUMENTS

| | | | |
|---|---|---|---|
| 6,342,830 B1 * | 1/2002 | Want et al. .................. 340/10.1 |
| 6,370,586 B2 * | 4/2002 | Davis et al. .................. 709/244 |
| 2004/0139238 A1 * | 7/2004 | Luhrs ................................ 710/1 |
| 2005/0024349 A1 | 2/2005 | Shon |
| 2006/0192899 A1 * | 8/2006 | Ogita ............................ 348/744 |
| 2006/0255139 A1 | 11/2006 | Lee et al. |
| 2007/0029629 A1 * | 2/2007 | Yazdi ............................ 257/414 |
| 2007/0159755 A1 * | 7/2007 | Talbot et al. .................. 361/115 |
| 2008/0005398 A1 * | 1/2008 | Huffman ........................ 710/39 |
| 2008/0144270 A1 * | 6/2008 | Dal Porto et al. ............. 361/684 |
| 2009/0201636 A1 * | 8/2009 | Doherty et al. .......... 361/679.26 |

FOREIGN PATENT DOCUMENTS

| | | |
|---|---|---|
| CN | 1575117 A | 2/2005 |
| CN | 1866031 A | 11/2006 |
| CN | 101567931 A | 10/2009 |
| TW | I234907 | 7/2005 |
| TW | M337349 | 8/2008 |

OTHER PUBLICATIONS

China Patent office, Office Action, Patent Application Serial No. 200910131302.1, Apr. 15, 2011, China.

\* cited by examiner

*Primary Examiner* — Courtney Smith

(57) ABSTRACT

An electronic device is provided, including a processing unit and a G-sensor electrically connected thereto. The G-sensor detects the posture of the electronic device and outputs a measurement signal to the processing unit accordingly. The processing unit produces a thermal control signal according to the measurement signal, so as to reduce heat generated from the electronic device or increase cooling efficiency of the electronic device.

13 Claims, 6 Drawing Sheets

ELECTRONIC DEVICE

CROSS REFERENCE TO RELATED APPLICATIONS

This Application claims priority of Taiwan Patent Application No. 098111629, filed on Apr. 8, 2009, the entirety of which is incorporated by reference herein.

BACKGROUND OF THE INVENTION

1. Field of the Invention

The invention relates in general to an electronic device and in particular to an electronic device having a G-sensor.

2. Description of the Related Art

Conventional laptop computers usually comprise heat pipes for heat transmission from an electronic component to a heat sink, so as to prevent unexpected crashing or failure of the conventional laptop computers due to overheating. The heat pipe contains a working fluid therein for heat transfer, wherein the working fluid is heated and evaporated at a hot end of the heat pipe, and the evaporated working fluid is condensed at a cold end of the heat pipe and flows back to the hot end by capillarity, thus completing the operation cycle for cooling.

When the laptop computer is inclined with respect to the horizontal plane, as shown in FIG. 1, mobility and circulation of the working fluid within the heat pipe can be adversely affected by gravity. Thus, cooling efficiency of the heat pipe is reduced and overheating of the laptop computer may occur.

BRIEF SUMMARY OF INVENTION

The invention provides an electronic device including a processing unit and a G-sensor electrically connected thereto. The G-sensor detects the posture of the electronic device and outputs a measurement signal to the processing unit accordingly. The processing unit produces a thermal control signal according to the measurement signal, so as to reduce heat generated from the electronic device or increase cooling efficiency of the electronic device.

BRIEF DESCRIPTION OF DRAWINGS

The invention can be more fully understood by reading the subsequent detailed description and examples with references made to the accompanying drawings, wherein.

DETAILED DESCRIPTION OF INVENTION

Figure 1:
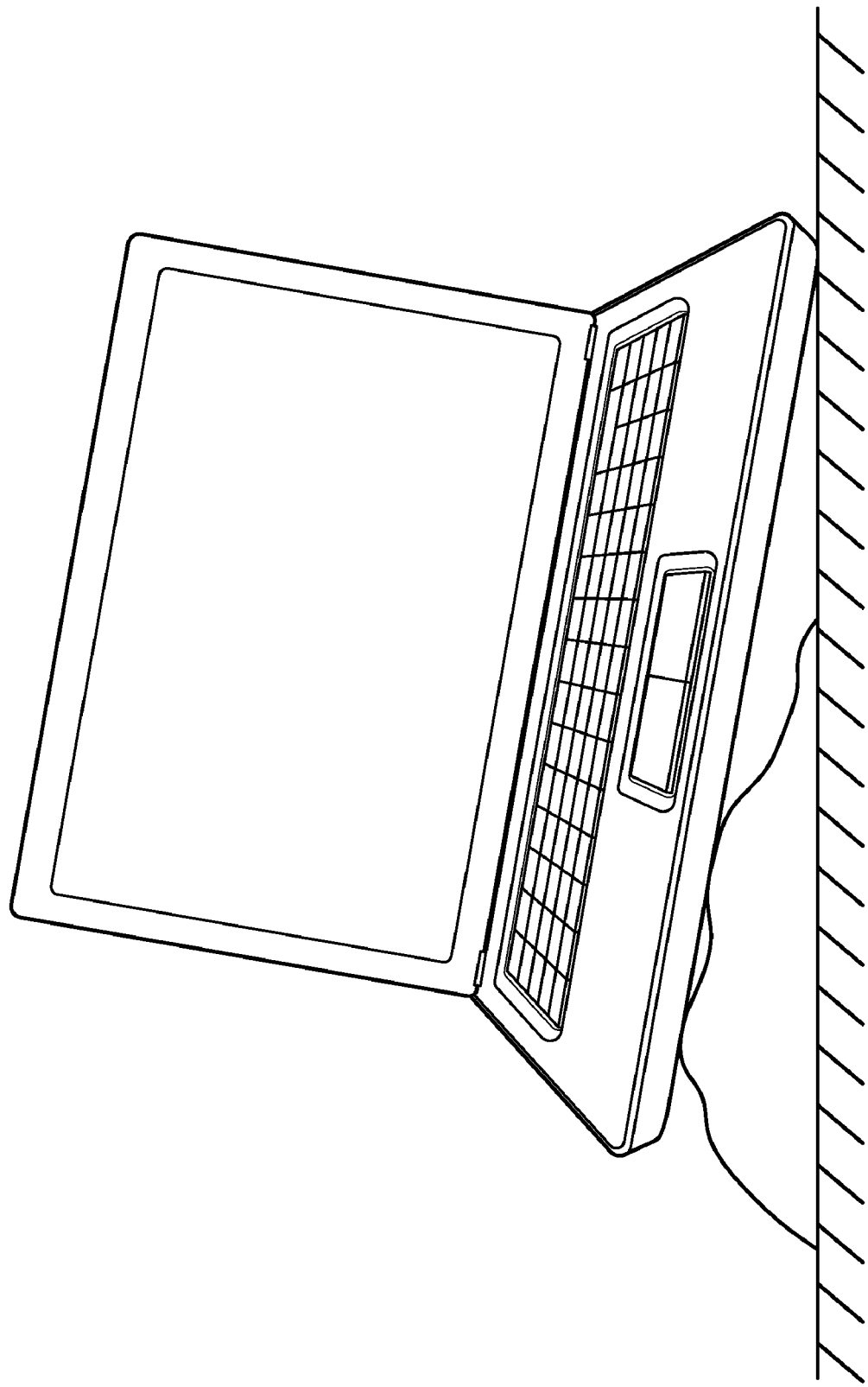
FIG. 1 is a perspective diagram of a laptop computer inclined with respect to a horizontal plane.
Figure 2:
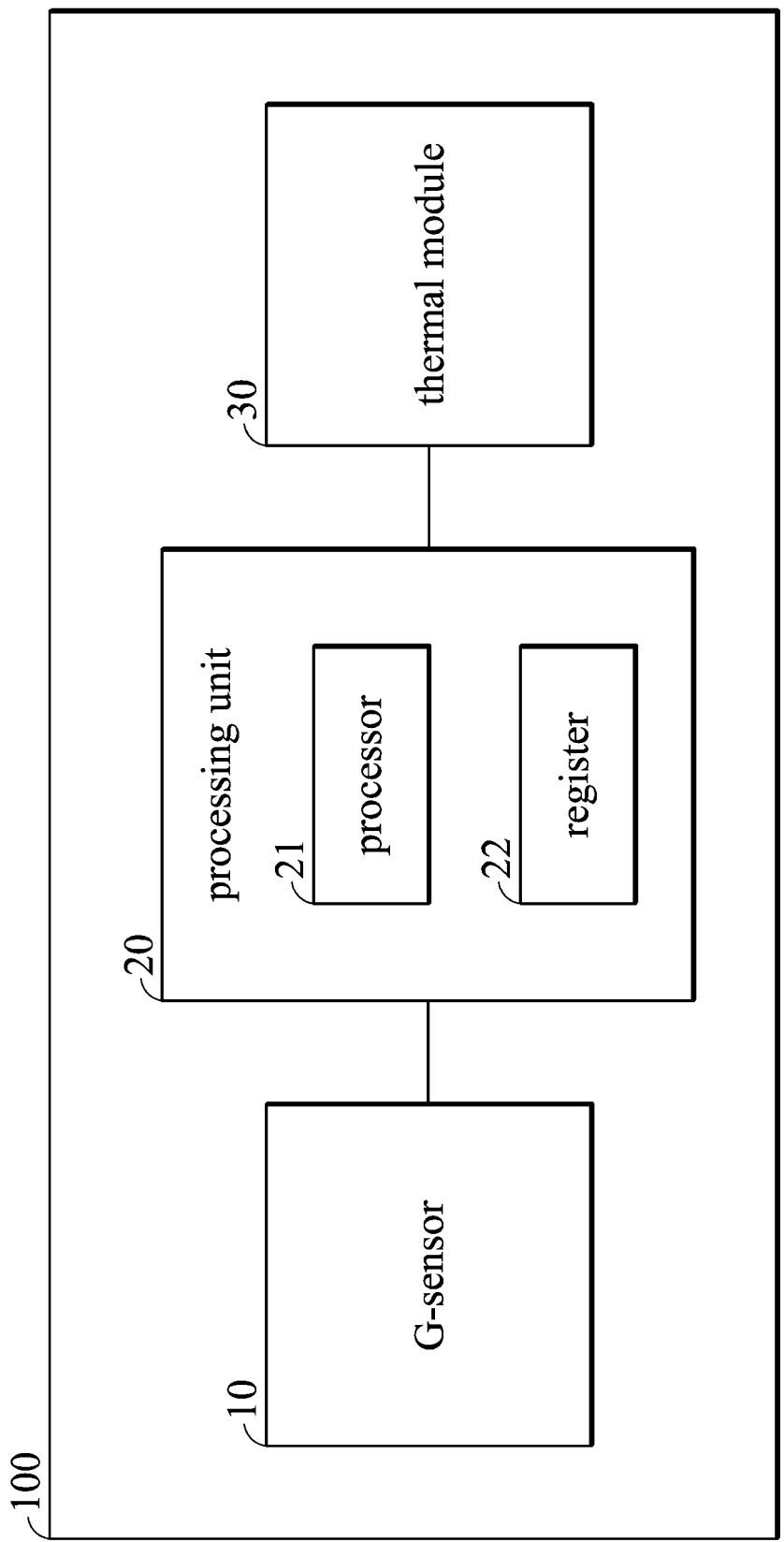
FIG. 2 is a schematic block diagram of an electronic device in accordance with an embodiment of the invention.

Referring to FIG. 2, an embodiment of an electronic device 100, such as a laptop computer, primarily comprises a G-sensor 10, a processing unit 20 electrically connected to the G-sensor 10, and a thermal module 30 electrically connected to the processing unit 20. The processing unit 20 produces a thermal control signal to the thermal module 30 according to a measurement signal from the G-sensor 10, so as to control or adjust power output of the thermal module 30.

In this embodiment, the G-sensor 10 is used to detect gravity direction and perceive whether the electronic device 100 is inclined with respect to the horizon in 3D space. As inclination of the electronic device 100 can adversely affect thermal efficiency of the heat pipe and lead to overheating, the present invention provides some significant means to overcome the problems. A conventional G-sensor is a kind of accelerometer to detect acceleration of gravity in 3D space. For example, the G-sensor can be applied to a hard disk drive (HDD) for posture detection. In practice, the G-sensor is adapted to perceive a drop of the HDD by detecting posture variation thereof. Once a drop of the HDD is detected, a magnetic head is retracted from the hard disk to avoid drop impact damages of the HDD. Similar applications of the G-sensor can be found in U.S. Pat. No. 6,754,021, U.S. Pat. No. 6,453,266 and U.S. Pat. No. 7,469,571. Additionally, the G-sensor can also be applied to video game controllers, such as the remotes of Wii home video game consoles by Nintendo which can be used as a handheld pointing device and detect movement in three dimensions.

The G-sensor 10 in FIG. 2 may comprise a CMOS-MEMS chip to detect an inclined angle of the electronic device 100 with respect to the horizon. When the electronic device 100 is at an inclined posture, the G-sensor 10 transmits a measurement signal to the processing unit 20 through a System Management Bus (SMBus). In this embodiment, the processing unit 20 comprises a processor 21 and a register 22. The processor 21 transmits the thermal control signal to the thermal module 30 according to a comparison result of the measurement signal and a predetermined data stored in the register 22, thereby adjusting power output of the thermal module 30. In some embodiments, the register 22 may be a ROM or RAM. The measurement signal contains an inclined angle value of the electronic device 100, and when the inclined angle value exceeds a reference value of the predetermined data, the processor 21 transmits the thermal control signal to the thermal module 30, whereby power output of the thermal module 30 is increased for cooling the electronic device 100. In this embodiment, the processing unit 20 is an IC component with the processor 21 and the register 22 embedded therein. However, the processor 21 and the register 22 can also be two individual IC components electrically connected with each other.

As aforementioned, excessive inclination of an electronic device 100 can adversely affect fluid circulation and thermal efficiency of the heat pipe therein. To address the issue, the processing unit 20 may transmit the thermal control signal to the thermal module 30 through a PWM interface, according to the measurement signal from the G-sensor 10, thus promptly controlling the thermal module 30. In this embodiment, the thermal module 30 may comprise a fan or thermoelectric cooler (TEC). Specifically, the processing unit 20 can transmit the thermal control signal to the thermal module 30 through the PWM interface to increase power output of the thermal module 30 (to increase the fan speed or power output of the TEC for cooling), thus preventing overheating of the electronic device 100.

Figure 3:
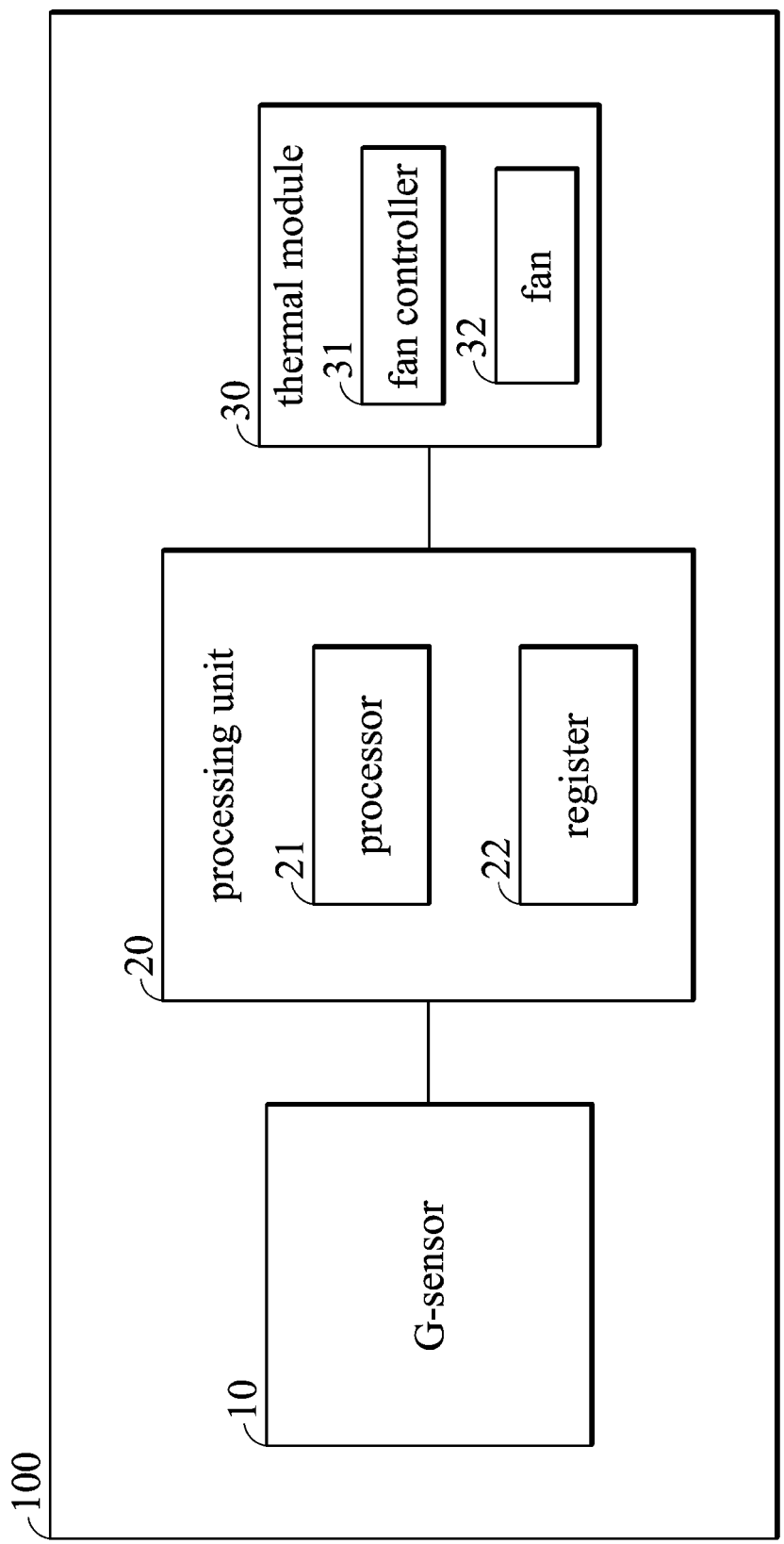
FIG. 3 is a schematic block diagram of an electronic device in accordance with another embodiment of the invention.

Referring to FIG. 3, another embodiment of the processing unit 20 may transmit the thermal control signal to the thermal module 30 through an SMBus. As shown in FIG. 3, the thermal module 30 comprises a fan controller 31 and a fan 32, wherein the fan controller 31 receives the thermal control signal through the SMBus and controls the fan 32, so as to increase speed of the fan 32 and prevent overheating of the electronic device 100.

Figure 4:
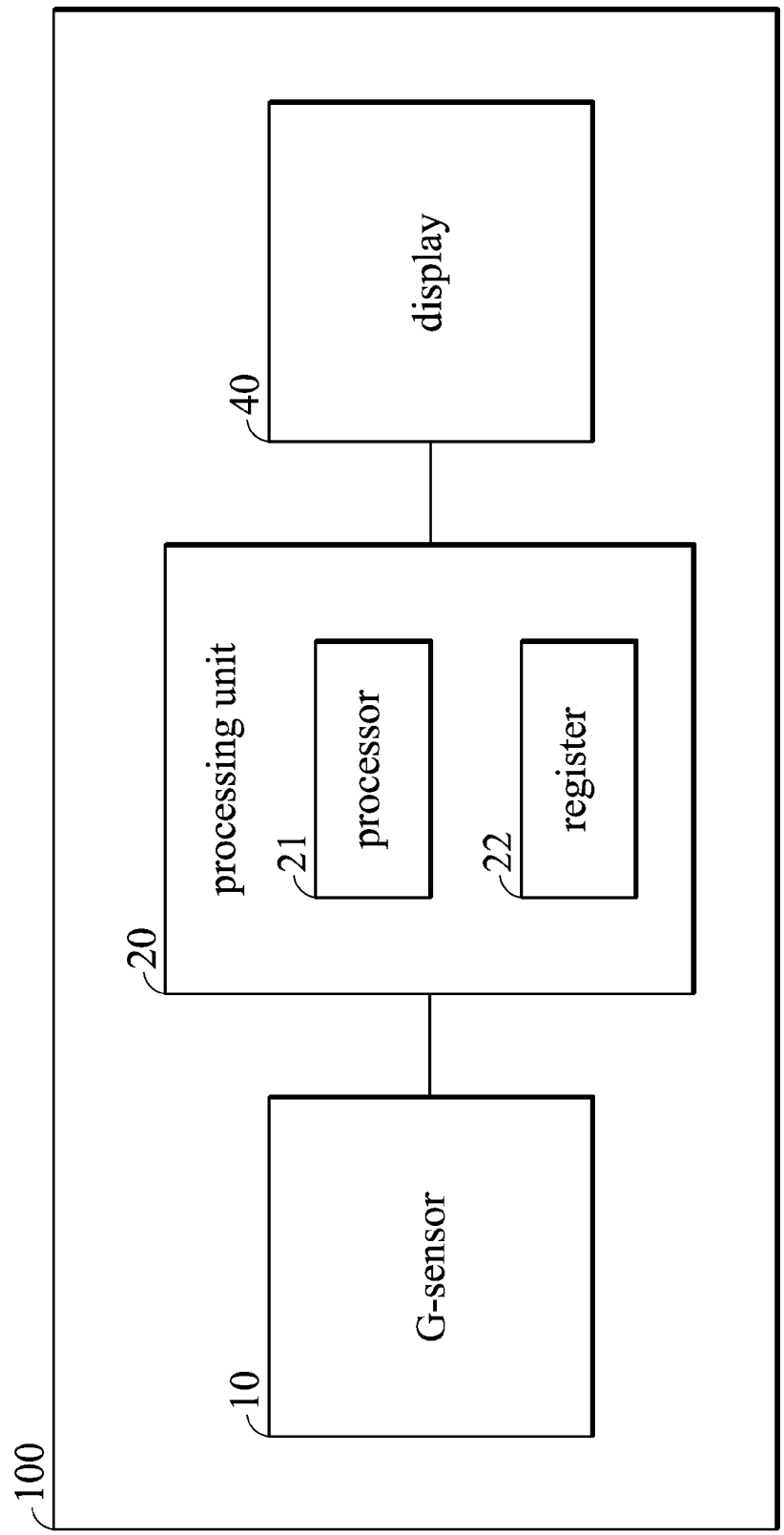
FIG. 4 is a schematic block diagram of an electronic device in accordance with another embodiment of the invention.

In some embodiments, the electronic device 100 can also be switched to a power saving mode, thus preventing overheating and reducing generation of heat. Referring to FIG. 4, when the electronic device 100 is excessively inclined with respect to the horizon, the processing unit 20 transmits the thermal control signal through a PWM interface to a display 40 of the electronic device 100, so that the display 40 is switched to a power saving mode or shut off. Hence, heat generated from the display 40 is reduced, and overheating of the electronic device 100 is prevented. In an exemplary embodiment, the display 40 may comprise an LCD or OLED.

Figure 5:
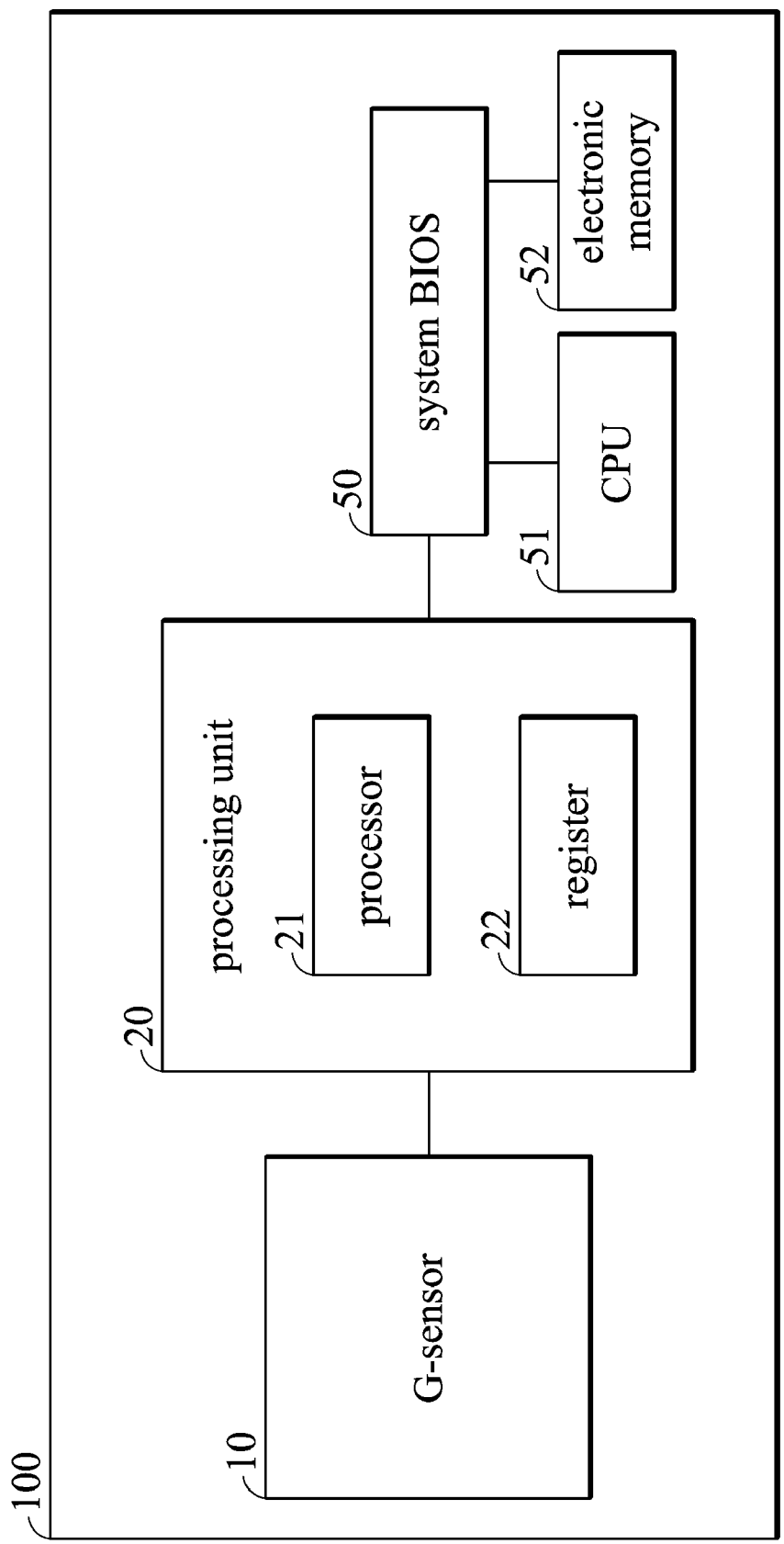
FIG. 5 is a schematic block diagram of an electronic device in accordance with another embodiment of the invention.

Referring to FIG. 5, in another embodiment of the invention, generation of heat is suppressed by reducing operating frequency of a CPU or electronic memory. As shown in FIG. 5, the processing unit 20 transmits the thermal control signal through a Low Pin Count (LPC) bus to a system BIOS 50 of the electronic device 100, so as to adjust operating frequency of the CPU 51 or the electronic memory 52 (such as DDR memory). In this embodiment, the operating frequency of the CPU 51 or the electronic memory 52 can be reduced and switched to a power saving mode. Since lowering operating frequency of the CPU 51 and the electronic memory 52 can suppress generation of heat, the electronic device 100 can be used in a stable temperature environment even with low cooling efficiency.

Figure 6:
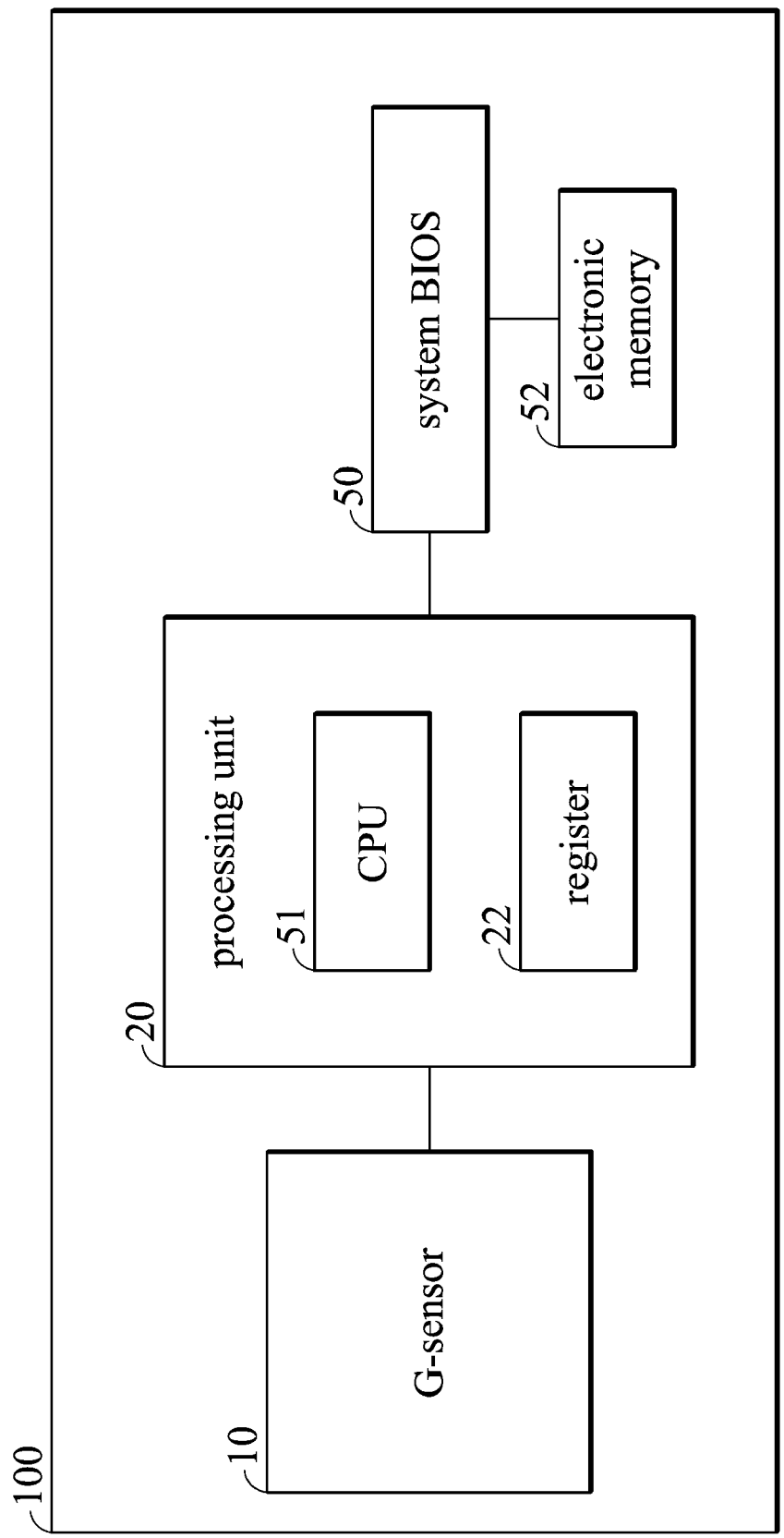
FIG. 6 is a schematic block diagram of an electronic device in accordance with another embodiment of the invention.

As shown in FIG. 6, the processing unit 20 comprises a CPU 51. When the electronic device 100 is excessively inclined with respect to the horizon, operating frequency of the CPU 51 automatically descends, responsive to the measurement signal from the G-sensor 10. Furthermore, the processing unit 20 may transmit the thermal control signal to the system BIOS 50 to reduce operating frequency of the electronic memory 52.

The invention provides an electronic device having a G-sensor to perceive an inclined posture thereof and output a measurement signal. Specifically, a processing unit of the electronic device receives the measurement signal and produces a thermal control signal, so as to suppress generation of heat or increase thermal efficiency of the electronic device. In an exemplary embodiment, the processing unit transmits the thermal control signal to a thermal module to increase power output thereof for cooling. In some embodiments, operating frequency of a CPU or electronic memory may descend and switch to a power saving mode, so as to prevent overheating by a heat generating element, such as a display. The heat generating element is electrically connected with the processing unit, such as a CPU, electronic memory or the like. Since the electronic device of the invention can perceive whether it is situated in a normal or inclined posture by the G-sensor, so that operation may be performed in a stable temperature range to prevent overheating, the electronic device of the invention can be widely applied to laptop computers, tablet computers or other portable electronic devices.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation to encompass all such modifications and similar arrangements.

What is claimed is:

1. An electronic device, comprising:
   a G-sensor detecting a posture of the electronic device and outputting a measurement signal according to the posture;
   a processing unit electrically connected to the G-sensor and receiving the measurement signal, wherein the processing unit produces a thermal control signal according to the measurement signal, thereby reducing heat generated from the electronic device or increasing cooling efficiency of the electronic device; and
   a heat generating element electrically connected to the processing unit, wherein the processing unit transmits the thermal control signal to the heat generating element and switches the heat generating element to a power saving mode, wherein the heat generating element is a display, and wherein the processing unit transmits the thermal control signal to the display through a PWM interface.

2. The electronic device as claimed in claim 1, further comprising a thermal module electrically connected to the processing unit, wherein the processing unit transmits the thermal control signal to the thermal module to increase power output of the thermal module for cooling the electronic device.

3. The electronic device as claimed in claim 2, wherein the processing unit comprises a processor and a register, and the processing unit transmits the thermal control signal to the thermal module according to a comparison result of the measurement signal and a predetermined data stored in the register.

4. The electronic device as claimed in claim 3, wherein the register comprises a ROM or RAM.

5. The electronic device as claimed in claim 3, wherein the measurement signal contains an inclined angle value of the electronic device, and when the inclined angle value exceeds a reference value of the predetermined data, the processing unit transmits the thermal control signal to the thermal module to increase power output of the thermal module for cooling the electronic device.

6. The electronic device as claimed in claim 3, wherein the processing unit comprises an IC component with the processor and the register embedded therein.

7. The electronic device as claimed in claim 3, wherein the processor and the register are two individual IC components electrically connected with each other.

8. The electronic device as claimed in claim 2, wherein the processing unit transmits the thermal control signal to the thermal module through a PWM interface.

9. The electronic device as claimed in claim 8, wherein the thermal module comprises a fan, and the processing unit transmits the thermal control signal through the PWM interface to control speed of the fan.

10. The electronic device as claimed in claim 2, wherein the processing unit transmits the thermal control signal to the thermal module through an SMBus.

11. The electronic device as claimed in claim 10, wherein the thermal module comprises a fan and a fan controller, and the processing unit transmits the thermal control signal to the fan controller through the SMBus to control speed of the fan.

12. The electronic device as claimed in claim 1, wherein the G-sensor comprises a CMOS-MEMS chip.

13. The electronic device as claimed in claim 1, wherein the processing unit transmits the thermal control signal to shut off the display.

* * * * *